May 9, 1939.　　　　D. F. KEITH　　　　2,157,708

COMBINATION GAUGE SYSTEM

Filed April 29, 1937

INVENTOR
David F. Keith.
BY
ATTORNEY

Patented May 9, 1939

2,157,708

UNITED STATES PATENT OFFICE 2,157,708

COMBINATION GAUGE SYSTEM

David F. Keith, Cleveland, Ohio

Application April 29, 1937, Serial No. 139,696

18 Claims. (Cl. 73—291)

This invention relates to improvements in combination gauge systems, and more particularly to a combination electric gasoline gauge and electrolyte level indicator.

An object of the invention is to provide a gauge system of the type described particularly well adapted for use on the instrument boards of automobiles.

Another object is to utilize the usual gasoline gauge to also indicate the level of the electrolyte in a storage battery.

A further object is to provide a combination gauge of standard construction with a special dial to permit it to be used for two separate sets of indications—one for gasoline and one for electrolyte.

Other objects will be apparent from the following specification, wherein the invention is shown as applied to a well known type of gasoline gauge suitably modified to carry out the invention. And while this embodiment is shown by way of illustration, it will be apparent that the invention can be carried out with various modifications without, however, departing from the scope of the appended claims.

Figure 1:
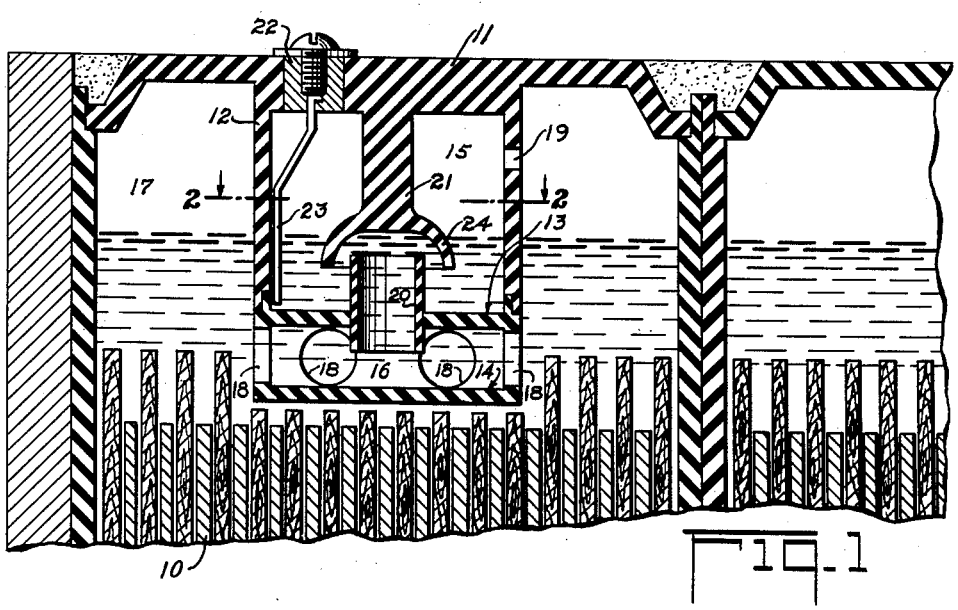
Figure 1 is a vertical sectional view of a storage battery equipped with an electrolyte level contactor forming part of the invention.

Referring to Figure 1, the numeral 10 denotes one cell of a storage battery of any suitable construction in which a liquid electrolyte such as sulphuric acid and water is used. Three such cells connected in series are commonly employed in automobiles, each cell being provided with the usual vented filler cap (not shown). The construction and arrangement of the cells is immaterial to the present invention, as with such a battery of cells, when water is added to one cell, it is usually added to all, and therefore, to practice this invention and determine the liquid level in all the cells, it is only necessary to equip one of them with the level contactor.

The level contactor is preferably molded integral with the top 11 of the cell, and comprises the downwardly extending tubular member having two transverse walls 13, 14 therein. These walls divide the interior of the member 12 into an upper chamber 15 and a lower chamber 16.

The lower chamber 16 is open to the interior 17 of the cell via a plurality of vents or openings 18. The upper chamber 15 is closed except for a vent 19 located well above the normal upper liquid level.

A vertical tube or pipe 20 (which may be molded integral with the member 12) extends downwardly into chamber 16 and upwardly into chamber 15 and forms the only means by which liquid can pass from one chamber to the other.

Positioned over the open upper end of tube 20 is a shield 21 which may preferably be a stem molded integral with member 12 having a flared open end positioned above the tube 20 as shown in Figure 1.

A terminal 22 preferably of lead is molded into the top 11 and carries any suitable means on its outer face such as the usual screw connection for the circuit wire. Secured to the bottom of this terminal is a contact 23 of any suitable conductive material that is inert to the electrolyte such as carbon or palladium, which extends downwardly nearly to the bottom of chamber 15.

The relative size of the parts just described depends upon the dimensions and liquid level of the cell in which they are used. In one well known type of battery in common use the height of the chamber 15 may be 1¼" and the diameter thereof 1¼". The height of tube 20 above the bottom 13 of this chamber may be $\frac{5}{16}$" and the inside diameter of tube 20 may be ⅜". The exact dimensions of the chamber 16 and the other parts are not material, but it is desirable that the distance between the upper edge of tube 20 and the nearest adjacent surface of the under side of the flared end 24 of shield 21 be approximately 2 mm., with the dimensions of the other parts as herein given.

Figure 3:
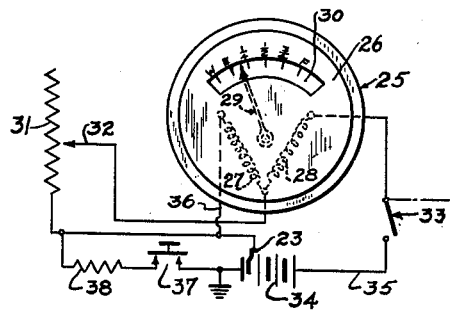
Figures 3 and 4 are circuit diagrams showing how the various parts including the meter or gauge per se are connected for operation.
Figure 2:
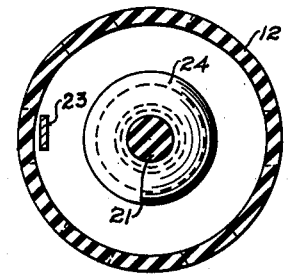
Figure 2 is a section on the line 2—2, Figure 1.

Referring to Figure 3, the meter or gauge 25 as a well known type having a casing 26 containing the gauge mechanism, which may be of the conventional differential type comprising the coils 27, 28 which through mechanism (not shown) move the needle 29 over a dial 30. Such gauges are in common use, and any suitable gauge can be used provided it can be connected as shown in the figures.

The dial 30 is usually graduated to show the amount of gasoline in a tank, and commonly reads from E at the left to a maximum number of gallons or tank quantities, such as "E, ¼, ½, ¾, F" as shown in the figures. For use with the present invention, the dial must be remarked and the gauge recalibrated.

Figure 4:
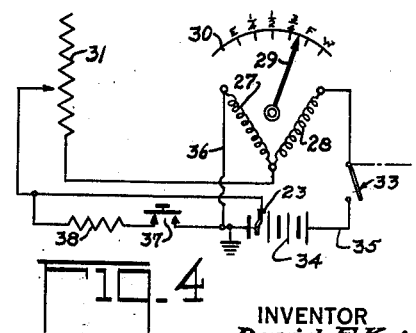

Referring to Figure 3, the dial is marked "W" to give water readings (for the liquid level in the battery) and "E, ¼, ½, ¾, F" for gasoline readings. Other markings may be used as shown in Figure 4.

In the gasoline tank is placed the usual potentiometer or resistance 31 adapted to be contacted by the float controlled contact arm 32, whereby, depending upon the level of the gasoline in the tank, more or less resistance is connected in series with the coils 27, 28, which cause the pointer or needle 29 to come to rest at the corresponding scale division.

The apparatus being connected as shown in Figure 3 and the usual ignition switch 33 being closed (it is customary to connect the gauge 25 to the battery via this switch) a circut can be traced from the battery cells 34 via conductor 35 through switch 33 through coil 28 and 27 via conductor 36 to the contact 23 in one of the battery cells. If electrolyte liquid fills tube 20 and the chamber 15 to a level as high or higher than the lower edge of shield 21, the circuit is completed and the gauge needle will stand somewhere between E and F on the gauge and not at "W". This indicates that the liquid level in the cell is at a proper height and the gauge is controlled by the position of the contact 32 in the gasoline tank.

Should the liquid level be such that the liquid in the cell does not connect with the contact 23, the needle will be at "W" as the battery circuit is opened between 23 and the liquid in the cell, thereby indicating that the battery needs water.

Should the gauge be at "W" and it is desired to take a reading of the gasoline, the push button switch 37 and compensating resistance 38 are used and this button when pressed re-establishes the circuit through the last or lefthand cell of the battery 34 to cause the gauge to give gasoline readings.

In Figure 4 the operation is the same as that described in Figure 3 but when the circuit that includes contact 23 is open the gauge mechanism operates to hold the needle against the right hand stop and the letter "W" at this position on the dial indicates that water is required in the battery. When the circuit at 23 is closed, the gauge operates in the usual manner to indicate the amount of gasoline in the tank.

The construction of the level contactor is such that the surface tension of liquid on the top of tube 20 causes the liquid to rise in the form of a flat dome which resists the flow of liquid up the tube until the liquid level rises in the cell to a predetermined maximum. When the maximum is reached, the column of liquid in the tube suddenly starts upward, sweeping all air bubbles ahead of it and the liquid fills chamber 15 to the same height as the liquid in the cell.

When evaporation has lowered the liquid in the cell to a point near the bottom of chamber 15, the tension between the surface of the liquid in the chamber 15 and the lower periphery of the shield 24 is broken and the liquid level in tube 20 drops near to the level of the liquid in the cell, and thus opens the circuit. The tube 20 and shield 24 together form a syphon tube of which the shield is the shorter leg and tube 20 the longer leg. Any gas rising from the cell and passing into chamber 16 rises therein above the lower end of tube 20 therein so that none of it finds it way up tube 20 and under the shield 24. Gas escapes from chamber 16 through the vents 18, as the upper portions of said vents are above the bottom of tube 20. Such gas as is formed at the contact or electrode 23 escapes from chamber 15 via vent 19.

By the foregoing means, a rather sudden make-and-break of the circuit including contact 23 is effected which eliminates the uncertain contact that would arise if the contact 23 merely dipped into the liquid, in which case, as evaporation is very slow, the contact between the liquid and the extreme bottom end of 23 would "hang on", the "break" would be uncertain and slight changes in position of the liquid and temperature would cause serious errors in the operation of the device. With the present arrangement the actual surface of the contact 23 in contact with the liquid remains practically constant at all liquid levels until the minimum is actually reached, when the circuit is quickly broken as just described.

Also by reason of the construction herein described, all effects due to jolts or changes in liquid level caused by the automobile going up and down hills or over bumps is eliminated, as the level in the level contactor remains practically constant until the liquid actually recedes therein due to evaporation from the cell. The specific gravity of the liquid has no effect on the operation of the device.

What is claimed is:

1. In a system of the class described, a battery cell, a vessel, a contact member in said vessel, syphonic communicative means between said battery cell and said vessel whereby a connection may be established between said contact member and the liquid in said cell via liquid in said syphonic means, an indicating instrument, and conductive means by which said battery cell, said vessel, said syphonic communicating means and said indicating means are included in an electrical circuit.

2. In a system of the class described, a battery cell, a vessel, a contact member in said vessel, syphonic communicative means between said battery cell and said vessel whereby a connection may be established between said contact member and the liquid in said cell via liquid in said syphonic means, means for excluding gas from said syphonic communicative means, an indicating instrument, and conductive means by which said battery cell, said vessel, said syphonic communicative means and said indicating means are included in an electrical circuit.

3. In a system of the class described, a battery cell, contact means in said cell out of contact with the liquid therein when same is below a predetermined level and in contact with said liquid when same is at or above said level, a tank, contact means in said tank controlled by the liquid level therein, an indicating instrument having a single pointer and a graduated dial therefor, and circuit means between both said means and said instrument whereby the latter will normally operate to indicate the liquid level in said tank only when said first means is in contact with the liquid in said cell.

4. In a system as claimed in claim 3 wherein said indicating instrument has two actuating coils, one of said coils being connected to both said means and the other of said coils being connected to a battery cell in series with said first cell.

5. In a system of the class described, a battery comprising a series of cells, contact means in said battery out of contact with the liquid therein when said liquid is below a predetermined level and contacting with said liquid when same is at or above said level, an indicating instrument having coils in series, one of said coils being connected to one terminal of said battery, the other of said coils being connected to said contact member, a member forming a chamber surrounding said contact member, and means including a syphon for admitting liquid from one of said cells to said chamber to operate said contact member therein to complete a circuit therethrough including both said coils and said battery to cause said instrument to indicate said predetermined height of liquid in one of said cells.

6. In a system as claimed in claim 5 wherein the junction between said coils is connected to contact mechanism operated by the height of liquid in a tank, said mechanism also being in circuit with the contact member in said chamber.

7. In a system as claimed in claim 5 wherein one terminal of said battery is grounded, a contact mechanism operated by the height of liquid in a tank having one terminal thereof connected to said contact member and the other terminal thereof connected to the junction between the coils of the indicating instrument.

8. In a system of the class described, a battery cell containing electrolyte, a member forming a chamber in liquid communication with said electrolyte, a contact member in said chamber, means forming a syphon between the interior of said cell and said chamber whereby a connection may be established between said contact member and the liquid in said cell via liquid in said syphonic means, and an indicating instrument having an operating coil connected in series with said cell and contact member.

9. In a system of the class described, a battery cell containing electrolyte, a member forming a chamber in liquid communication with said electrolyte, a contact member in said chamber, means forming a syphon between the interior of said cell and said chamber whereby a connection may be established between said contact member and the liquid in said cell via liquid in said syphonic means, an indicating instrument having coils in series connected to the terminals of said cell, and liquid level indicating means including a movable contact member connected to the midpoint between said coils and one of the terminals of said cell.

10. An electrolyte level contactor comprising a member forming a chamber, means within said chamber forming a liquid syphon the shorter leg of which is in the chamber and the longer leg of which extends downwardly through the bottom of said chamber to the exterior thereof, and a circuit contact supported on said member and extending downwardly in the chamber therein to a point adjacent the bottom thereof.

11. An electrolyte level contactor comprising a member forming a chamber having a horizontal bottom wall, a tubular member supported in said wall and extending above and below the upper and lower surfaces thereof, means extending from said member and positioned about the upper end of said tube and adapted to cooperate therewith to form a syphon the shorter leg of which is in the chamber and the longer leg of which extends downwardly via said tube, and a circuit contact supported on said member and extending downwardly in the chamber therein to a point adjacent the bottom thereof.

12. An electrolyte level contactor comprising a member forming a chamber having a horizontal bottom wall, means supported in said wall and extending above and below the upper and lower surfaces thereof and adapted to form a liquid column, means positioned above the upper end of said liquid column adapted to cooperate therewith to form a liquid syphon, the shorter leg of which is within said chamber and the longer leg of which extends downwardly via said liquid column, and a circuit contact supported on said member and extending downwardly in the chamber therein to a point adjacent the bottom thereof.

13. An electrolyte level contactor comprising a member adapted to form the top closure of a battery cell and having a chambered portion extending downwardly into said cell said chamber having side and bottom walls, a tubular member supported in said bottom wall and extending above and below said wall, means extending from said member and positioned about the upper end of said tube and adapted to cooperate therewith to form a syphon the shorter leg of which is in the chamber and the longer leg of which extends downwardly via said tube, and a circuit contact supported on said member and extending downwardly in the chamber therein to a point adjacent the bottom thereof.

14. In combination with a storage battery, an electrolyte level contactor mounted in the upper part of said battery and comprising a member forming a chamber having side and bottom walls, a vertically positioned tubular member extending into said chamber above the bottom thereof and below said bottom wall, means comprising extensions of said side wall extending downwardly below said bottom wall and surrounding the lower portion of said tubular member, said downwardly extending side walls being closed at their bottom by a horizontal wall overlying some of the plates of said battery and closely adjacent the upper ends thereof, said downwardly extending walls having apertures therein to permit fluid to pass into said tubular member, means positioned about the upper end of said tube in said chamber and adapted to cooperate with said tube to form a syphon, the shorter leg of which is in the chamber and the longer leg of which extends downwardly via said tube, and a circuit contact extending downwardly into said chamber to a point adjacent the inner surface of the bottom thereof at a point below the upper end of said tubular member.

15. In a system of the class described, a gauge, a storage battery having a contact element in one of its cells adapted to make and break contact with the electrolyte therein, said contact and said battery being in series and connected to said gauge, a circuit including a contact device actuated by the height of gasoline in a tank connected to said gauge, said circuit being normally controlled by said contact element in said battery cell, and means including a manually operable switch for completing a circuit through said battery, gauge and contact device independently of the contact element in the battery cell.

16. In a system of the kind described, comprising a tank, contact means in said tank controlled by the liquid level therein, an indicating instrument, a circuit including said indicating instrument, contact means and a battery, and circuit breaking means controlled by the level of liquid in said battery.

17. In a system of the kind described, comprising a tank, contact means in said tank controlled by the liquid level therein, an indicating instrument, a circuit including said instrument, contact means and a battery, circuit breaking means controlled by the level of liquid in said battery, and a switch connected in said circuit adapted to bypass a portion of the circuit controlled by said circuit breaking means.

18. An instrument for indicating the liquid levels in separate receptacles comprising a hand adapted to move over a scale, means for moving said hand including a pair of coils connected in series, and said coils having one terminal connected to the junction thereof and separate terminals connected to the respective free ends of said coils, a scale for said instrument having markings thereon adapted when said instrument is operated to indicate the height of a liquid, an additional set of markings on said scale adapted to indicate the height of another liquid, a storage battery having a contact element in one of its cells adapted to make and break contact with the electrolyte therein, said contact and said battery being in series and connected with said instrument, and a circuit including a contact device actuated by the height of gasoline in a tank and connected to said instrument, said circuit being controlled by the contact element in said battery cell.

DAVID F. KEITH.